(12) United States Patent
Ng et al.

(10) Patent No.: US 9,606,844 B2
(45) Date of Patent: Mar. 28, 2017

(54) REMOTELY-HOSTED INTERACTIVE CLIENT-SERVER SESSION

(75) Inventors: Samuel Ng, Bellevue, WA (US); John F. Lam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 374 days.

(21) Appl. No.: 13/247,761

(22) Filed: Sep. 28, 2011

(65) Prior Publication Data

US 2013/0080506 A1 Mar. 28, 2013

(51) Int. Cl.
| | | |
|---|---|---|
| *G06F 15/16* | (2006.01) | |
| *G06F 9/54* | (2006.01) | |
| *G06F 11/36* | (2006.01) | |
| *G06F 9/44* | (2006.01) | |
| *H04L 29/08* | (2006.01) | |

(52) U.S. Cl.
CPC .............. *G06F 9/54* (2013.01); *G06F 8/33* (2013.01); *G06F 8/36* (2013.01); *G06F 11/3664* (2013.01); *H04L 67/08* (2013.01); *H04L 67/34* (2013.01); *G06F 2209/541* (2013.01)

(58) Field of Classification Search
CPC ...... G06F 3/048; G06F 9/54; G06F 2209/541; G06F 11/3664; G06F 8/33; G06F 8/36; H04L 67/08; H04L 67/34; H04L 67/02
USPC ....... 717/167, 110, 124, 125, 176, 177, 178; 709/203, 227, 246; 715/760
See application file for complete search history.

(56) References Cited

U.S. PATENT DOCUMENTS

| | | | | |
|---|---|---|---|---|
| 6,073,163 A | * | 6/2000 | Clark et al. | 709/203 |
| 6,145,096 A | | 11/2000 | Bereiter et al. | |
| 7,299,304 B2 | | 11/2007 | Saint-Hilaire et al. | |
| 7,716,631 B1 | * | 5/2010 | Katzer | 717/102 |
| 8,566,392 B1 | * | 10/2013 | Mitchell | G06F 17/3089 709/203 |
| 2002/0018077 A1 | * | 2/2002 | Powlette | 345/744 |
| 2002/0116412 A1 | * | 8/2002 | Barnes et al. | 707/513 |

(Continued)

OTHER PUBLICATIONS

Dennis Lu, Dr. C#: A Pedagogic IDE for C# Featuring a Read-Eval-Print-Loop—Published Date: Apr. 2003, http://citeseerx.ist.psu.edu/viewdoc/download?doi=10.1.1.112.818&rep=rep1&type=pdf.

(Continued)

*Primary Examiner* — Abdulkader M Alriyashi
(74) *Attorney, Agent, or Firm* — Kevin Sullivan; Date Drakos; Micky Minhas

(57) ABSTRACT

Embodiments are directed to interacting with a server in a read-eval-print loop (REPL) environment. In an embodiment, a client computer system receives a proxy object from a remotely-hosted server. The server maintains an execution context with which the client computer system interacts. The client system presents the received proxy object to the user for interaction with the object. The user input indicates how the data in the proxy object is to be processed. The interaction allows the user to manipulate the remotely-hosted data through the local computer system. The client system then, based on the user interaction, sends a user-initiated command to the remotely-hosted server using the proxy object. The user-initiated command indicates various portions of data hosted on the server that are to be returned to the user. The data received from the remotely-hosted server is then displayed at the client computer system.

18 Claims, 4 Drawing Sheets

(56) References Cited

U.S. PATENT DOCUMENTS

| | | |
|---|---|---|
| 2003/0028609 A1 | 2/2003 | Cahill |
| 2003/0149740 A1 | 8/2003 | Wookey et al. |
| 2007/0055958 A1* | 3/2007 | Birenheide et al. .......... 717/124 |
| 2007/0074185 A1* | 3/2007 | Meijer et al. ................. 717/140 |
| 2007/0078942 A1* | 4/2007 | Christfort et al. ............ 709/217 |
| 2008/0295078 A1* | 11/2008 | Stall .................... G06F 11/3664 717/125 |
| 2009/0328013 A1* | 12/2009 | Aharoni et al. .............. 717/140 |
| 2010/0198787 A1* | 8/2010 | Robertson et al. ........... 707/634 |
| 2010/0223385 A1* | 9/2010 | Gulley et al. ................. 709/226 |
| 2011/0167405 A1* | 7/2011 | Min ............................... 717/107 |
| 2011/0191385 A1* | 8/2011 | Mayatskikh et al. ......... 707/802 |
| 2012/0066394 A1* | 3/2012 | Revanuru et al. ............ 709/226 |

OTHER PUBLICATIONS

Brian R. Stoler, A Framework for Building Pedagogic Java Programming Environments—Published Date: Apr. 2002, http://citeseerx.ist.psu.edu/viewdoc/download?doi=10.1.1.102.7773&rep=rep1&type=pdf.

Charles S. Reis, A Pedagogic Programming Environment for Java that Scales to Production Programming—Published Date: Apr. 2003, http://citeseerx.ist.psu.edu/viewdoc/download?doi=10.1.1.108.5926&rep=rep1&type=pdf.

* cited by examiner

REMOTELY-HOSTED INTERACTIVE CLIENT-SERVER SESSION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to interact with other software applications or other computer systems. For example, as part of a computer programming environment, a read-eval-print loop (REPL) may be used to communicate with a server computer system. The client computer system typically creates a batch of commands and sends those commands to the server to be processed. The server then creates a context for processing the commands, processes the commands, tears down the processing context and returns the results to the user. The user's interactions with the server are thus disjointed and asynchronous.

BRIEF SUMMARY

Embodiments described herein are directed to interacting with a server in a read-eval-print loop (REPL) environment and to iteratively and interactively processing commands received in a read-eval-print loop (REPL) environment. In one embodiment, a client computer system receives a proxy object from a remotely-hosted server. The server maintains an execution context with which the client computer system interacts. The client system presents the received proxy object to the user for interaction with the object. The user input indicates how the data in the proxy object is to be processed. The interaction allows the user to manipulate the remotely-hosted data through the local computer system. The client system then, based on the user interaction, sends a user-initiated command to the remotely-hosted server using the proxy object. The user-initiated command indicates various portions of data hosted on the server that are to be returned to the user. The data received from the remotely-hosted server is then displayed at the client computer system.

In another embodiment, a server computer system maintains a running execution context associated with a client computer system. The running execution context allows users to interact with and perform iterative operations on the server's remotely-hosted data. The server receives a user-initiated command via a proxy object indicating various portions of data hosted on the server that are to be returned to the user. The server processes the received command within the running execution context, and any resulting state information is stored on the server. The server also sends the processed data to the user, allowing the user to interact with the received data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
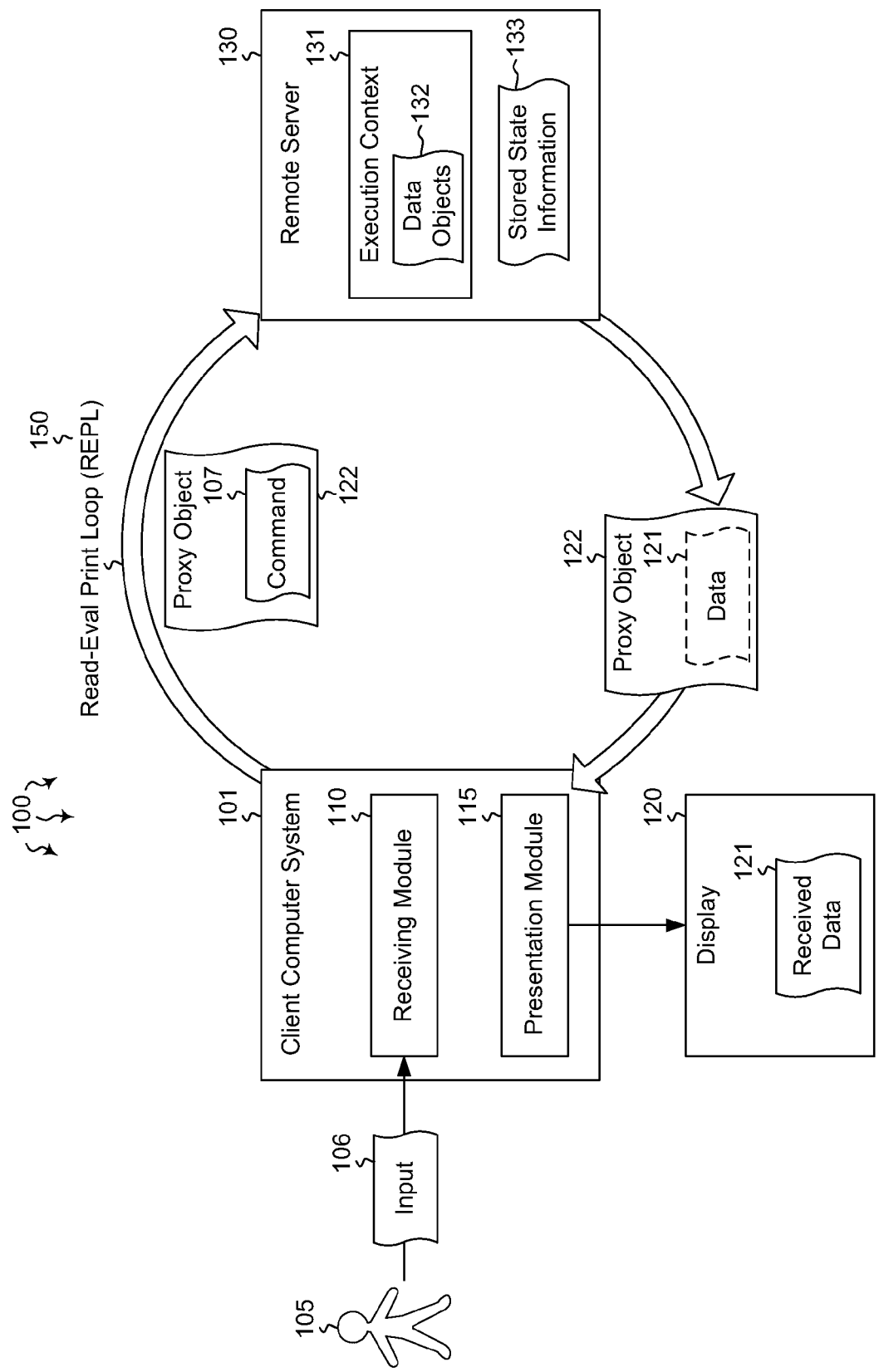
FIG. 1 illustrates a computer architecture in which embodiments of the present invention may operate including interacting with a server in a read-eval-print loop (REPL) environment.

Embodiments described herein are directed to interacting with a server in a read-eval-print loop (REPL) environment and to iteratively and interactively processing commands received in a read-eval-print loop (REPL) environment. In one embodiment, a client computer system receives a proxy object from a remotely-hosted server. The server maintains an execution context with which the client computer system interacts. The client system presents the received proxy object to the user for interaction with the object. The user input indicates how the data in the proxy object is to be processed. The interaction allows the user to manipulate the remotely-hosted data through the local computer system. The client system then, based on the user interaction, sends a user-initiated command to the remotely-hosted server using the proxy object. The user-initiated command indicates various portions of data hosted on the server that are to be returned to the user. The data received from the remotely-hosted server is then displayed at the client computer system.

In another embodiment, a server computer system maintains a running execution context associated with a client computer system. The running execution context allows users to interact with and perform iterative operations on the server's remotely-hosted data. The server receives a user-initiated command via a proxy object indicating various portions of data hosted on the server that are to be returned to the user. The server processes the received command within the running execution context, and any resulting state information is stored on the server. The server also sends the processed data to the user, allowing the user to interact with the received data.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes client computer system 101 and server computer system 130. These computer systems may be any type of local or distributed computer systems, including cloud computing systems. Each computer system may include different modules for performing various operations. For instance, client computer system 101 may include a receiving module 110 that is configured to receive proxy objects 122 and/or data from server 130. The receiving module may also be configured to receive user input 106 from user 105 and any other users that interact with the server. This module, and the other modules of the client and server work together to provide a rich client experience locally on the client computer system while interacting with a Read Eval Print Loop (REPL) session that provides access to the large amounts of data and computing power hosted on the server.

In some embodiments, a host component may be installed on the server 130 and a client component on the client computer system 101. The client connects to the server and initiates a session. The client provides a rich, interactive user experience on top of the traditional REPL prompt, taking input 106 from the client 105 and sending the corresponding commands to the server. For example, the client may be using a software development tool such as an integrated development environment (IDE). The rich, interactive user experience may be provided while the user is using the IDE. Commands inputted to the IDE are passed on to the server using a proxy object. The server then responds with the requested data, which is then used for the software the user is developing within the IDE. This is designed to occur in an iterative and interactive manner.

Once the server receives the command 107 (via proxy object 122), the server will execute the command in the server's execution environment 131, and will return a proxy result object 122 to the client for interrogation and manipulation. The client can then interact with the object locally (e.g. within the IDE or other program the user is using). The execution environment or "execution context" 131 may be a running context maintained by the server in connection with the session established with the client. The client can interact with that context, and perform iterative operations on it. The proxy object calls back out to the server to fulfill its client requests for interrogation. At least in some cases, the server is configured to cache the results for greater performance.

The REPL environment may be surfaced to the user 105 through a user interface (UI) panel in the software development tool. If the user has an active development project opened within the software development tool, the REPL environment interacts with the development tool to append the project environment with the REPL environment. Thus functions and variables defined in the software project are automatically available to the REPL environment. Moreover, since the REPL's interactiveness occurs remotely, the software development tool's environment is also serialized and sent to the server to annotate the server's session with the state of the development tool.

In some cases, the result of a command issued by the user may be a visualization or graph that the server returns through the proxy object 122. The resultant proxy object may then be used by the client to render the visualization locally on the client's machine (e.g. within the IDE). The user can then interact graphically with the visualization. As the user interacts in this manner, the client computer system can take those interactions, send them as commands 107 to the server. Thus, the user's graphical manipulations can directly affect the execution context running remotely on the server.

In some implementations, the remote server 130 may be configured to listen to incoming data requests coming from remote clients. The data requests are validated, and, upon validation, allow transparent communication between the client and server. On startup, the server initializes a REPL context which stores the name/value pair of variables that the user has declared. It also stores a list of loaded and available libraries that the client can consume. When the client gets a request, it sends the text form of the request to the server.

Depending on the text that the client has sent, the server will take different actions. For instance, for a variable declaration statement, the server will create an entry in a context table to store the name of the variable and the initialized value. In other cases, whenever a variable is used in a read-context, the server will generate a dictionary access to get the value of the variable in place of the variable itself. For example, if there was a variable named 'a' with a value of "10", and the user attempted to execute the code "print (a)", the server would transform that code to look something like "print(dictionary.get("a"))". In still other cases, whenever a variable is written to, the server will generate a dictionary write against the name of the variable so that it can keep track of the latest value.

Whenever a command results in a value (or other data) to be returned, the server checks to see if the value has a specific handler that has been registered. If there is no handler, the default option of converting the result to a string is used, and the resultant string is sent back to the client. If there is a custom handler, then the custom handler is invoked. For example, a custom handler may be used with visualizations. If the user executes a command which results in a visualization being created, the custom handler renders the visualization, saves the image in a specified location, and returns the location to the client. The client then has special handling code that will display this image inline to the user (e.g. within the software development tool).

When the client gets a request that involves various portions of the IDE, it packages the current project in a serializable way (e.g. using some serialized string format) and sends the package along with the client request to the server. When the server receives the request, it first parses the project environment to check if there are any errors. If there are, the server attempts to execute the user's command without the project context. If that fails, then the server returns the error notification to the user. These concepts will be explained further below in conjunction with methods 200 and 300 of FIGS. 2 and 3, respectively.

Figure 2:
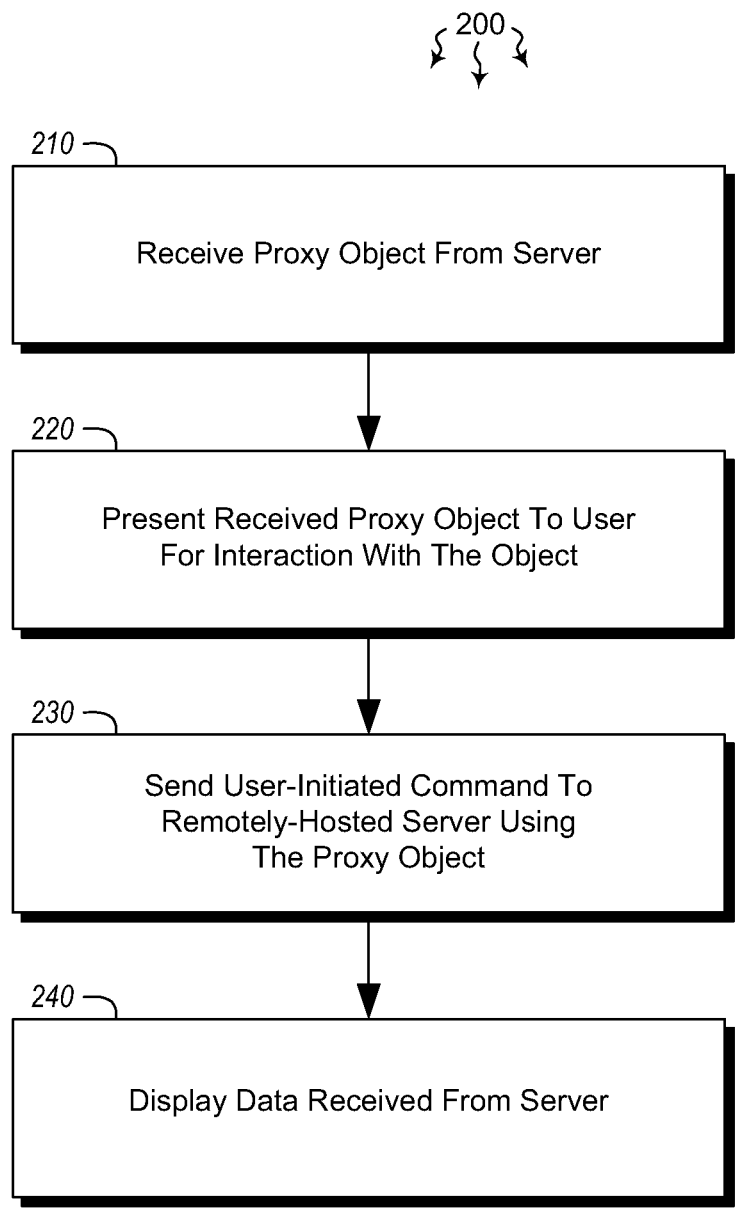
FIG. 2 illustrates a flowchart of an example method for interacting with a server in a read-eval-print loop (REPL) environment.
Figure 3:
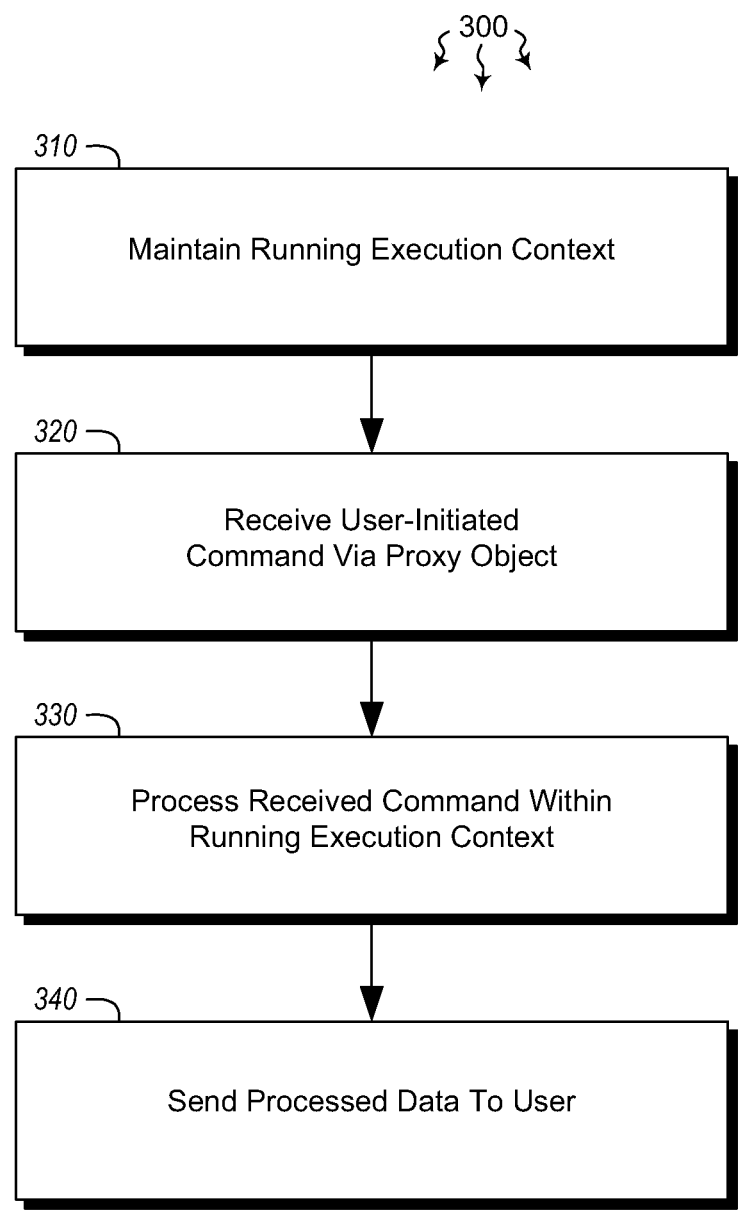
FIG. 3 illustrates a flowchart of an example method for iteratively and interactively processing commands received in a read-eval-print loop (REPL) environment.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for interacting with a server in a read-eval-print loop (REPL) environment. The method 200 will now be described with frequent reference to the components and data of environment 100.

Method 200 includes an act of receiving at a client computer system a proxy object from a remotely-hosted server, the server maintaining an execution context with which the client computer system interacts (act 210). For example, receiving module 110 of computer system 101 may receive proxy object 122 from remotely-hosted server 130. The client computer system may establish a session with the server, and the proxy object may have been sent as part of the session. Conventional authentication techniques may be used to authenticate the user 105 and initiate the session. In some cases, the session may be initiated within an integrated development environment (IDE). As such, the user may use the IDE on the client system and establish the server session from with the IDE. The session then allows the user to develop software code in the IDE using remotely-hosted data 132 on the remotely-hosted server.

The execution context 131 established by the remote server may be used by the user to interact with the remotely-hosted server content. The execution context may provide data 121 from its store of data objects 132. These data objects may be used in combination with other (local) data objects within the IDE. The IDE environment may be appended to the REPL environment 150. As such, functions and variables defined in the IDE are automatically available to the REPL environment. Moreover, the IDE environment may be serialized and sent to the remotely-hosted server to annotate the established client-server session with the state of the IDE environment.

Method 200 also includes an act of presenting the received proxy object to the user for interaction with the object, wherein user input indicates how the data in the proxy object is to be processed, the interaction allowing the user to manipulate the remotely-hosted data through the local computer system (act 220). For example, proxy object 122 sent from server 130 may be presented to user 105 for interaction with the object using presentation module 115. The user (e.g. within the IDE) may interact with the proxy object and/or data 121. The user's input indicates how the remotely-hosted data is to be used within the IDE. For example, if the user wants to implement a function stored on the remote server in one of the user's programs, the user can interact with the proxy object to indicate which function they want to use. This function will then be provided via the proxy object 122 over the REPL environment. Each time the user needs another remotely-hosted function, it can be provided using this process. As such, the remotely-hosted server can iteratively provide functions or other data objects as needed to the user.

Method 200 includes, based on the user interaction with the proxy object, an act of the client computer system sending a user-initiated command to the remotely-hosted server using the proxy object, the user-initiated command indicating one or more portions of data hosted on the server that are to be returned to the user (act 230). Thus, for instance, depending on how the user has interacted with the proxy object, the client computer system may send command 107 in proxy object 122 to the server 130. The command may include instructions for the server and/or a request for data. As in the example above, if the user is requesting a function or some other type of data object to use in a software program they are developing, the command may indicate that the requested data objects are to be sent to the user from the server.

In some cases, user-defined software functions may actually be sent to the remotely-hosted server for storage and subsequent retrieval by the user. Thus, a user may create functions that may be imported to the server and there used by other users. The functions stored on the remotely-hosted server may be configured for late-bound access using a dictionary lookup. For example, a user may declare a variable x=10, and enter a command to print "x". When the "x" variable is created, the server creates a dictionary of variable names to runtime values. Thus, if the user changes the value to 11, the server can consult the dictionary of variables and change its value from the original value (10) to 11. The user-defined software functions as well as the user-initiated commands may include type identifiers that identify the type of command or function. This type identifier may enable the server to parse and store the command or function in its data store. In some cases, any data retrieved by the remotely-hosted server is cached for subsequent retrieval by user 105 or by another user.

Method 200 further includes an act of displaying data received from the remotely-hosted server at the client computer system (act 240). For example, display 120 may display the received data 121 received from the remotely-hosted server 130. The data may be displayed in a rich, contextual manner on the client computer system. For instance, if the received data is part of a software program the user is working on within an IDE, the received data elements may be displayed in the IDE, along with the other existing content. In this manner, data received from the server by means of the REPL environment may be integrated into the IDE, and may be interacted with through the IDE, as if the data were local to the client's computer.

Figure 4:
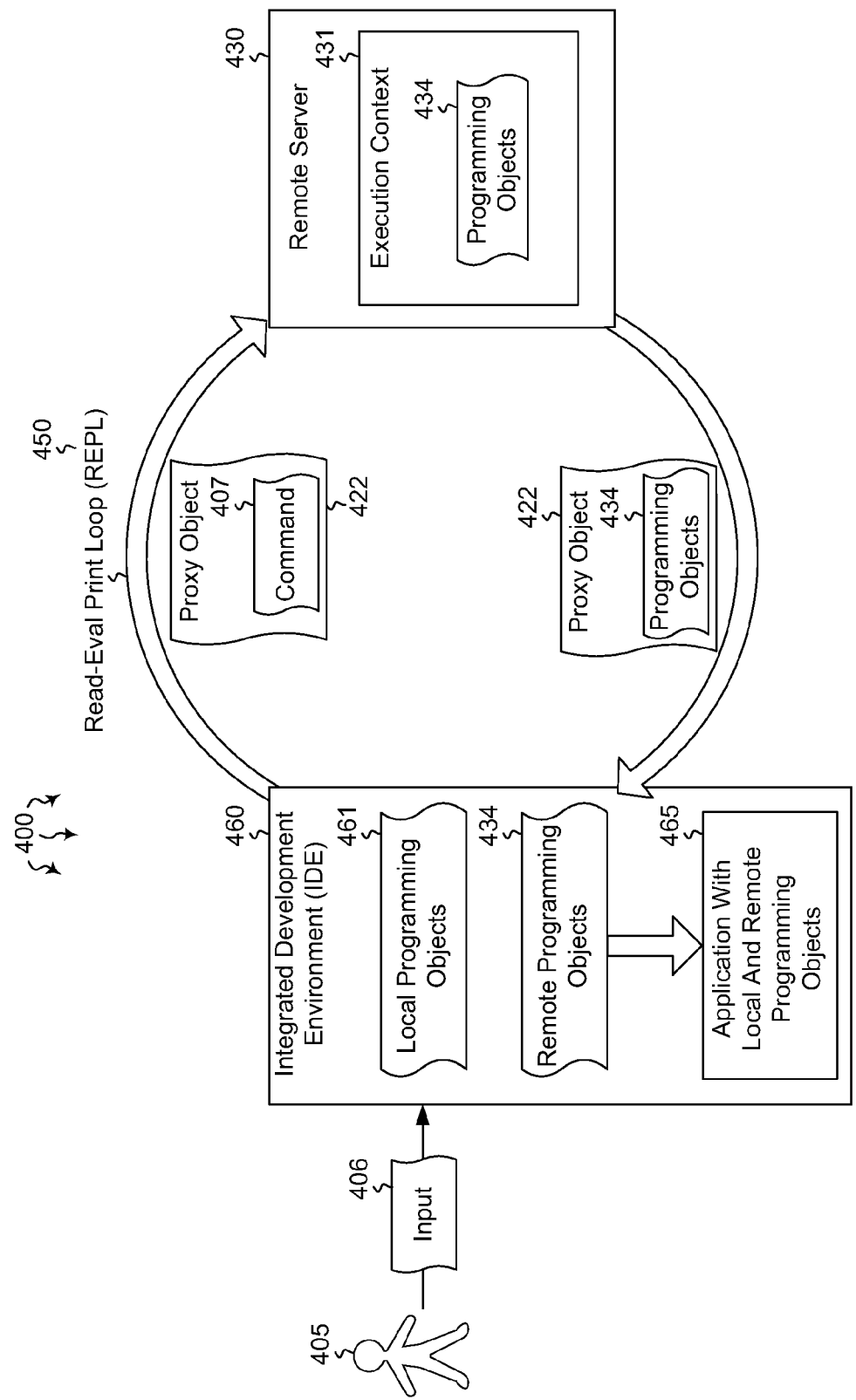
FIG. 4 illustrates an alternative computer architecture in which a server may iteratively and interactively process commands received in a read-eval-print loop (REPL) environment.

FIG. 3 illustrates a flowchart of a method 300 for iteratively and interactively processing commands received in a read-eval-print loop (REPL) environment. The method 300 will now be described with frequent reference to the components and data of environment 400 of FIG. 4.

Method 300 includes an act of maintaining a running execution context associated with a client computer system, the running execution context allowing users to interact with and perform iterative operations on the server's remotely-hosted data (act 310). For example, remote server 430 may maintain execution context 431. This execution context may be established as part of a client-server session, and thus may be maintained by the server as long as the session is running. The session may be established in a read-eval print loop (REPL) environment 450. The execution context allows the user 405 to interact (via input 106) with the server and perform operations using its remotely-hosted programming objects 434.

Method 300 includes an act of receiving a user-initiated command via a proxy object indicating one or more portions of data hosted on the server that are to be returned to the user (act 320). For example, the server 430 may receive proxy object 422 containing user-initiated command 407 (as provided by the user in input 406). The command may indicate that various portions of data hosted on the server (e.g. programming objects 434) are to be returned to the user for implementation in integrated development environment (IDE) 460. In cases where user-defined software functions received at the server computer system, they are persistently stored for subsequent retrieval by the user. Moreover, these user-defined functions may be made available for other users to use. As mentioned above, user-initiated commands received at the server may include type identifiers that identify the type of command. The type identifiers enable the server to quickly parse and store the command as an identified and categorized command.

Method 300 includes an act of processing the received command within the running execution context, wherein any resulting state information is stored on the server (act 330). The remote server 430 may process received command 407 within execution context 431, and store the resulting state information 133 on the server. The processed data is then sent to the user, allowing the user to interact with the received data (act 340). In some cases, the processed data may include a rendered visualization. The rendered visualization allows the user to interact graphically with the visualization. If the rendered visualization includes a set of points on a graph, the server may calculate a visualization graph and sends the corresponding image to the user. Other image optimizations may be implemented by the user or by a server administrator.

The visualization may be presented in the IDE 460, along with other local programming objects 461. The application 465 being developed by the user 405 may thus have both local and remote programming objects (including visualizations). These may be provided via the REPL environment 450. During the established client-server session, the user may continue to request remotely-stored programming objects, and may continue to implement them in the program (s) they are developing.

Accordingly, methods, systems and computer program products are provided which allow interaction with a server in a read-eval-print loop (REPL) environment. Moreover, methods, systems and computer program products are provided which iteratively and interactively process commands received in a read-eval-print loop (REPL) environment. As such, a user can request and receive rich programming components over REPL using his native software development tool.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer system including at least a processor and a memory, in a computer networking environment including a plurality of computing systems, a computer-implemented method for iteratively interacting with a server in a read-eval-print loop (REPL) environment, wherein the server is remotely-hosted, the method comprising:
   receiving at the client computer system a proxy object from the server, the proxy object associated with a session established with the server, the established session is initiated within an integrated development environment (IDE) at the client computer system, the server maintaining an execution context associated with the session with which the client computer system iteratively interacts and performs operations on remotely-hosted data on the server, the execution context storing a plurality of name/value pairs for variables declared by a user and storing a list of loaded and available libraries consumable by the client computer system, and the proxy object comprising data from within the server execution context;
   presenting the proxy object to the user for interaction with the proxy object, wherein user input indicates how the data in the proxy object is to be processed and indicates a function to be provided by the server through the REPL environment, the function provided by the server being provided to the user through the proxy object, the interaction allowing the user to manipulate the remotely-hosted data through the client computer system;
   based on the user interaction, the client computer system sending a second proxy object containing a user-initiated command to the server, the user-initiated command including a type identifier and indicating that both one or more portions of data hosted on the server and a result of executing the function on the server are to be returned to the user through the REPL environment, wherein the one or more portions of data hosted on the server comprising programming objects; and
   displaying, at the client computer system, the result of executing the function received through the REPL environment from the server, and integrating, by the processor, the programming objects in the IDE.

2. The method of claim 1, wherein the established session allows the user to develop software code using the remotely-hosted data on the server.

3. The method of claim 1, wherein the user implements the execution context to interact with content hosted on the server.

4. The method of claim 1, wherein the IDE is appended to the REPL environment, such that functions and variables defined in the IDE are automatically available to the REPL environment.

5. The method of claim 1, wherein the IDE is serialized and sent to the server to annotate the established session with a state of the IDE.

6. The method of claim 1, wherein data received from the server is displayed in a rich, contextual manner on the client computer system.

7. The method of claim 1, wherein one or more user-defined software functions are sent to the server for storage and subsequent retrieval by the user.

8. The method of claim 1, wherein an initial user-initiated command includes a type identifier that identifies a type of command, enabling the server to parse and store the initial user-initiated command.

9. The method of claim 1, wherein data retrieved by the server is cached for subsequent retrieval.

10. The method of claim 1, wherein functions stored on the server are configured for late-bound access using a dictionary lookup.

11. At a server computer system including at least one processor and a memory, in a computer networking environment including a plurality of computing systems, a computer-implemented method for iteratively and interactively processing commands received in a read-eval-print loop (REPL) environment, the method comprising the server computer system performing the following operations:
   establishing a session with a client computer, the established session is initiated within an integrated development environment (IDE) at the client computer;
   maintaining a running execution context associated with the session and associated with the client computer, the running execution context allowing a user to iteratively interact with and perform iterative operations on data remotely-hosted on the server computer system, the execution context storing a plurality of name/value pairs for variables declared by the user and storing a list of loaded and available libraries consumable by the client computer;
   sending a proxy object to the client computer, the proxy object associated with the session and the running execution context, and the proxy object enabling the user to send commands to and receive data from the running execution context through the REPL environment;
   receiving a second proxy object containing a user-initiated command including a type identifier and indicating that both one or more portions of data hosted on the server computer system and a result of executing a function on the server computer system are to be returned to the user through the REPL environment, wherein the one or more portions of data hosted on the server computer system comprising programming objects;
   processing the user-initiated command within the running execution context and storing resulting state information on the server computer system;
   sending processed data to the user within a proxy result object through the REPL environment, the proxy result object comprising the processed data, allowing the user to interact locally with the processed data via the proxy result object; and
   displaying, at the client computer, the result of executing the function received through the REPL environment, and integrating, by the client computer, the programming objects in the IDE.

12. The method of claim 11, wherein the processed data comprises a rendered visualization.

13. The method of claim 12, wherein the rendered visualization allows the user to interact graphically with the visualization.

14. The method of claim 12, wherein upon determining that the rendered visualization comprises a set of points on a graph, the server computer system calculates a visualization graph and sends a corresponding image to the user.

15. The method of claim 11, wherein one or more user-defined software functions are received at the server computer system and are persistently stored for subsequent retrieval by the user.

16. The method of claim 11, wherein the type identifier identifies a type of command that enables the server computer system to parse and store the user-initiated command.

17. A computer system comprising the following:
one or more processors;
system memory;
one or more computer-readable storage media having stored thereon computer-executable instructions that, when executed by the one or more processors, causes a client computer system to perform a method for visually interacting with a rendered visualization in a read-eval-print loop (REPL) environment, the method comprising the following:
receiving at the client computer system a proxy object from a server, the server is remotely-hosted, the proxy object associated with a session established with the server, the established session is initiated within an integrated development environment (IDE) at the client computer system, the server maintaining an execution context associated with the session with which the client computer system iteratively interacts and performs iterative operations on data remotely-hosted on the server, the execution context storing a plurality of name/value pairs for variables declared by a user and storing a list of loaded and available libraries consumable by the client computer system, and the proxy object comprising data from within the execution context;
the client computer system sending a second proxy object containing a user-initiated command to the server, the user-initiated command including a type identifier and indicating that both one or more portions of data hosted on the server and a result of executing a function on the server are to be returned to the user through the REPL environment, wherein the one or more portions of data hosted on the server comprising programming objects;
receiving at the client computer system a proxy result object through the REPL environment from the server, the proxy result object includes the result of executing the function as a graph representation that is to be presented to the user as a visualization, and integrating, by the client computer system, the programming objects in the IDE;
using the received proxy object to render the visualization locally on the client computer system, wherein the rendered visualization allows the user to interact graphically with the visualization; and
sending interactions of the user with the rendered visualization to the server as commands, such that the user's interactions directly affect the context on the server.

18. The system of claim 17, wherein data received from the server is displayed in a rich, contextual manner on the client computer system.

\* \* \* \* \*